United States Patent [19]

Traut

[11] Patent Number: 4,615,859

[45] Date of Patent: Oct. 7, 1986

[54] METHOD OF MANUFACTURE OF IMPROVED RADOME STRUCTURE

[75] Inventor: G. Robert Traut, S. Killingly, Conn.

[73] Assignee: Rogers Corporation, Rogers, Conn.

[21] Appl. No.: 263,191

[22] Filed: May 13, 1981

[51] Int. Cl.$^4$ .............................................. B27J 5/00
[52] U.S. Cl. .................................... 264/570; 264/101; 264/118; 264/122; 264/126; 264/127; 264/162; 264/314; 264/571
[58] Field of Search .............. 264/118, 122, 126, 101, 264/570, 571, 127, 162, 313, 314

[56] References Cited

U.S. PATENT DOCUMENTS

| 2,937,401 | 5/1960 | Amos | 264/571 |
| 3,235,636 | 2/1966 | Trimble | 264/127 |
| 3,235,637 | 2/1966 | Hoffman et al. | 264/127 |
| 3,336,873 | 8/1967 | Wilford | 264/56 |
| 3,383,444 | 5/1968 | Loyet | 343/872 |
| 3,470,284 | 9/1969 | Hartmann | 264/313 |
| 3,523,148 | 8/1970 | Boyers et al. | 264/570 |
| 3,897,527 | 7/1975 | Ringdal | 264/126 |
| 3,962,393 | 6/1976 | Blad | 264/571 |
| 4,102,969 | 7/1978 | Duperray et al. | 264/127 |
| 4,285,896 | 8/1977 | Miller et al. | 264/127 |
| 4,342,679 | 8/1982 | Abrahams et al. | 264/127 |
| 4,364,884 | 12/1982 | Traut | 264/118 |
| 4,451,833 | 5/1984 | Traut | 343/872 |

Primary Examiner—Jeffery Thurlow
Assistant Examiner—Patrick Dailey
Attorney, Agent, or Firm—Fishman & Dionne

[57] ABSTRACT

A radome being a unitary structure comprised of a fiber reinforced plastic is produced with a large percentage of the fibers being randomly oriented in a plane parallel to the inner surface of the radome. The radome is produced by packing a layer of fiber filled powder around a mandrel having its outer contour resemble the inner contour of the radome. The mandrel and packed powder are then subjected to isostatic pressing to properly orient the fibers. The radome is finished by sintering the powder and removing the finished form from the mandrel.

24 Claims, 8 Drawing Figures

METHOD OF MANUFACTURE OF IMPROVED RADOME STRUCTURE

BACKGROUND OF THE INVENTION

(1) Field of the Invention

The present invention is directed to the fabrication of unitary structures, such as missile radomes, from fiber reinforced plastic material. More particularly, the present invention relates to fabrication of radomes which have better longitudinal strength and have a thermal expansion co-efficient that is better matched to supporting liners, while still providing acceptable ablative and rain erosion performance.

(2) Description of the Prior Art

Ceramic radomes are typically used for missiles intended to operate at speeds of Mach 4 or higher. These ceramic radomes have been found to be at best marginal in performance due to fragility, susceptability to thermal shock, high thermal conductivity and high rates of rain impact damage. A definite need exists for a workable alternative to ceramic radomes.

Radomes made from polymeric composite materials have been suggested as a possible alternative to ceramic radomes. Polytetrafluoroethylene, hereinafter PTFE, is one such polymeric material which might be suitable for radome applications. However, "neat" or simple filled PTFE does not possess the requisite characteristics, uniformity of erosion and ablation for example, for use in the demanding environment of a missile radome. Tests have shown that fiber reinforced PTFE; i.e., a PTFE composite having a high aspect ratio of fiber; would have those characteristics dictated by radome and similar usage.

Prior to the invention disclosed by my co-pending application Ser. No. 149,952, now U.S. Pat. No. 4,364,884 it has been a practical impossibility to fabricate a radome from a PTFE-fiber composite. The production of a solid block of PTFE composite of sufficient size to permit machining a radome therefrom is not feasible due to the virtual impossibility of heating such a large block through the crystalline melt point and subsequently cooling through the recrystallization point with enough uniformity of temperature to avoid fissures and damage from thermal stress. Furthermore, even if the temperature gradient and thermal stress problems could be avoided, an extremely long heating and cooling cycle (perhaps on the order of several weeks) would be required, and that long cycle time would result in thermal degradation. Other approaches, such as flowing a sheet of PTFE composite material to form a radome shape or laminating a series of rings or discs cut from such sheet material all involve substantial technical or cost problems which have previously precluded the use of such material and techniques.

My U.S. Pat. No. 4,364,884 discloses a novel radome structure comprised of a fiber reinforced plastic material wherein the fibers are to a high degree randomly oriented in a plane perpendicular to the axis of the radome. This novel fiber reinforced plastic radome is manufactured by sintering together preformed segments of the radome while maintaining axial pressure upon the segments. The preformed segments are formed by cold pressing the PTFE-fiber composite into rings or discs so that the fibers are oriented randomly in planes perpendicular to the axis of a disc. These discs are then machined to form a series of preforms of desired sizes and shapes. The preforms are arranged in a stacked formation within a mold cavity and subjected to heat and axial pressure. The resulting structure is machined to form the final desired product.

The final unitary product or radome disclosed in the above-mentioned U.S. patent overcomes many disadvantages of the prior art. It has excellent resistance to ablation and rain erosion and is not as fragile as previous ceramic radomes. Also, the fiber reinforced radome of U.S. Pat. No. 4,364,884 is economical to produce when compared to the cost of machining a radome from a large block of PTFE-fiber composite.

However, the radome of U.S. Pat. No. 4,364,884 possess characteristics which limit its usage. For example, since the fibers are oriented in a plane perpendicular to the radome axis the longitudinal tensile strength is comparatively low. Accordingly, a supporting liner is needed in some cases. The liner will typically be comprised of a filament glass fiber-epoxy structure or a polyimide glass fiber honeycomb structure. The bonding of a supporting liner within a previously formed radome may result in radome fracturing or incomplete bonding between the radome and the supporting liner. These problems associated with bonding a liner within a radome are due in part to the radome having a much higher degree of thermal expansion in the axial direction than does the supporting liner. These problems usually arise during the processing step when heat is applied to cure the adhesive used to bond the supporting liner within the radome. Either voids will form between the liner and the radome due to the radome expansion or the radome will fracture due to tension as it contracts on cooling if there is adequate bonding to the liner. It has also been observed that when exposed to low temperatures the bonded radome and liner assembly experiences axial stresses due to the differences in thermal expansion. These stresses result in tension between the radome and liner which can lead to fissure formation.

SUMMARY OF THE INVENTION

The present invention overcomes the above-discussed disadvantages and other deficiencies of the prior art by providing a novel method for the manufacture of a radome having a unitary structure.

The present invention comprises a novel radome, and method for the manufacture thereof, comprised of fiber-reinforced PTFE wherein the fibers are to a high degree randomly oriented in a plane parallel to the nearest or inner surface of the radome. Longitudinal strength is greatly improved and the thermal expansion co-efficient is better matched to supporting liners because of this fiber orientation. It is to be noted that resistance to ablation and rain erosion is not as great in the present invention as the radome disclosed by U.S. Pat. No. 4,364,884. However, the resistance properties of the present invention are acceptable for many utilizations.

The method of manufacturing the radome structure of the present invention includes uniformly packing a thoroughly blended mixture of a compound of PTFE in powder form and reinforcing fiber around a mandrel. The mandrel has a surface contour which resembles the desired contour of the radome interior. The mandrel with the powder packed around it is subjected to a sufficient external pressure for a sufficient period of time to compact the powder to almost its ultimate desired density. In order to assure that a large percentage of the fibers become oriented in a plane parallel to the nearest surface of the mandrel the pressure should be applied equally over the entire surface of the mandrel in a direction normal to the mandrel surface. The preferred method for applying this pressure is by a known isostatic pressing technique. The mandrel and powder are enclosed in a sealed flexible bag to prevent penetration of the pressing fluid into the powder. It is further preferable to evacuate any air from within the bag and powder in order to prevent fissures from developing in the powder layer when the pressure being applied is released.

After the powder layer has been compacted by the applied pressure it is subjected to a high enough temperature to fuse or sinter the PTFE. This temperature should range between 350° to 400° C. Furthermore in order to reduce the possibility of cracking or causing fissures within the radome this heating is carried out in an inert atmosphere. If the powder layer is heated while still positioned around the mandrel it is essential to maintain the temperature differences between the mandrel and the surrounding atmosphere within a narrow range. This is especially crucial when the temperature is being raised through the crystalline melting temperature of PTFE and when it is being lowered through the recrystallization temperature of PTFE. If the temperature difference between the mandrel and surrounding atmosphere becomes too great, the radome may crack or fissure.

After the mandrel, if still present, and the cured PTFE layer are cooled to room temperature, the PTFE layer is finished by machining it to the desired dimensions of the radome.

BRIEF DESCRIPTION OF THE DRAWINGS

The present invention may be better understood and its numerous objects and advantages will be apparent to those skilled in the art by reference to the accompanying drawings wherein like reference numerals refer to like elements in the several FIGURES, and wherein.

DESCRIPTION OF THE PREFERRED EMBODIMENT

The present invention comprises a novel method of manufacturing a unitary structure comprised of fiber-reinforced plastic material. It is to be noted that while a radome and the manufacture thereof will be discussed and illustrated, the invention is not limited to such use.

Figure 1A:
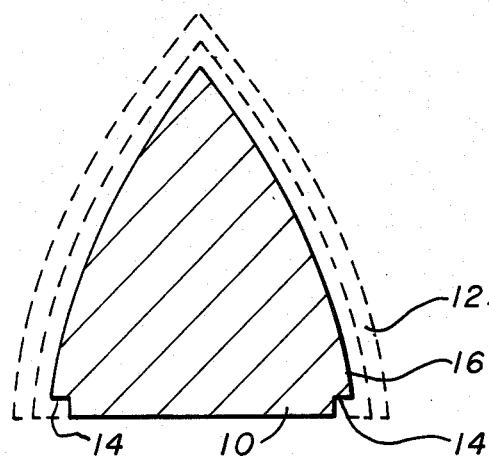
FIGS. 1A and 1B are cross-sectional views of two mandrels with compacted and pressurized PTFE composite layers indicated schematically, as employed in the novel manufacturing process of the present invention.
Figure 1B:
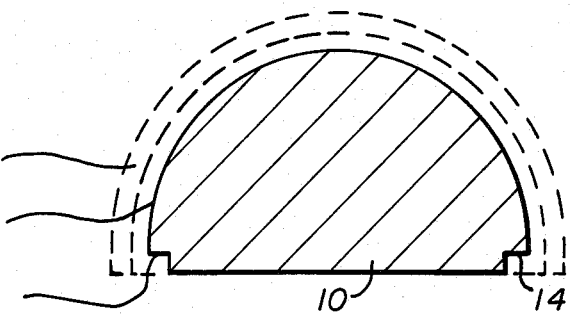
Figure 2:
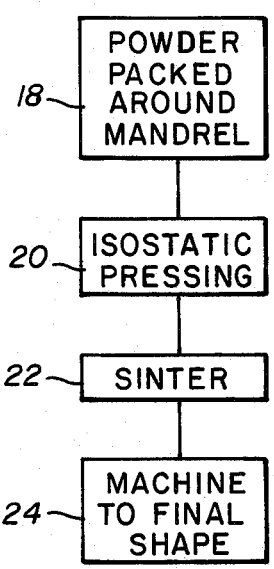
FIG. 2 is a flow diagram of the novel process of the present invention.

With reference now to the drawings, and particularly to FIGS. 1 and 2, the first step in the practice of the present invention involves packing a fiber-reinforced polytetraflouroethylene (hereinafter PTFE) powder to form layer 12 around mandrel 10. Mandrel 10 is preferably comprised of aluminum and has a surface contour 16 which resembles the desired contour of the interior surface of the radome. Mandrel 10 is prepared by any conventional machining technique and may be reused for processing numerous radomes of the desired shape. Preferably, mandrel 10 is provided with undercut 14 whose function will be discussed below.

Layer 12 is a thoroughly blended mixture of PTFE and reinforcing fiber. This blended compound is prepared by a dry process which provides an intimate blending of the PTFE particles with the individual fibers. Also, the compound powder is sifted through a screen to insure against lumps. Two examples of a thoroughly blended mixture capable of use in the practice of the present invention are "RT/duroid" types 5650M and 5870M available in molded and sintered shapes from Rogers Corporation, Rogers, Conn. and comprising by weight:

| "RT/duroid" type | 5650M | 5870M |
|---|---|---|
| "Teflon" 7A (polytetrafluoroethylene, available from E. I. duPont) | 75% | 85% |
| Ceramic fibers - comprising aluminum silicate fibers of random sizes and having an average diameter of about 1 μm and length of over 100 μm | 25% | 0% |
| Glass Microfibers (available from the John-Manville Corp. and having an average diameter of about 0.2 μm and length of over 30 μm) | 0 | 15% |

The final compounded powder has a preferred bulk density of about 0.25 grams/cubic centimeter.

The reinforcing fibers useful in the practice of the present invention may be comprised of a ceramic material, glass microfibers or other similar material. The fibers, which are inorganic, will typically range in diameter from 0.05 to 10 micrometers and will preferably have an aspect ratio of at least 30. The final fiber content of the powder composition should range between 5% and 40%.

While the above discussion has been limited to the use of only PTFE, other fluoropolymers may be added to the PTFE powder for the purpose of modifying the processing requirements or for obtaining certain desirable characteristics. Typically, such additives will possess lower melting temperatures, lower melt viscosity, better ability to wet fiber or filler surfaces, and better ability to close voids. Other types of PTFE resins which may be used are Teflon 7C or other commercially available granular or coagulated dispersion types of PTFE. Finally, melt processible fluoropolymers, such as Dupont's "Teflon" "FEP" or "PFA" may be added to serve as an aid to coalescence during the sintering step.

It is further possible to prepare the PTFE-fiber composite as an aqueous slurry. A PTFE dispersion is added along with a flocculating agent to a mixture of water and fiber. This slurry is then dewatered, by vacuum, against a mesh fabric covered form, preferably a perforated shell shaped similarly to the mandrel 10. The resulting low density "pulp form" shape has after drying an inside diameter resembling the form. A PTFE dispersion useful in the practice of the present invention is Fluon AD704, produced by ICI, America.

Figure 4A:
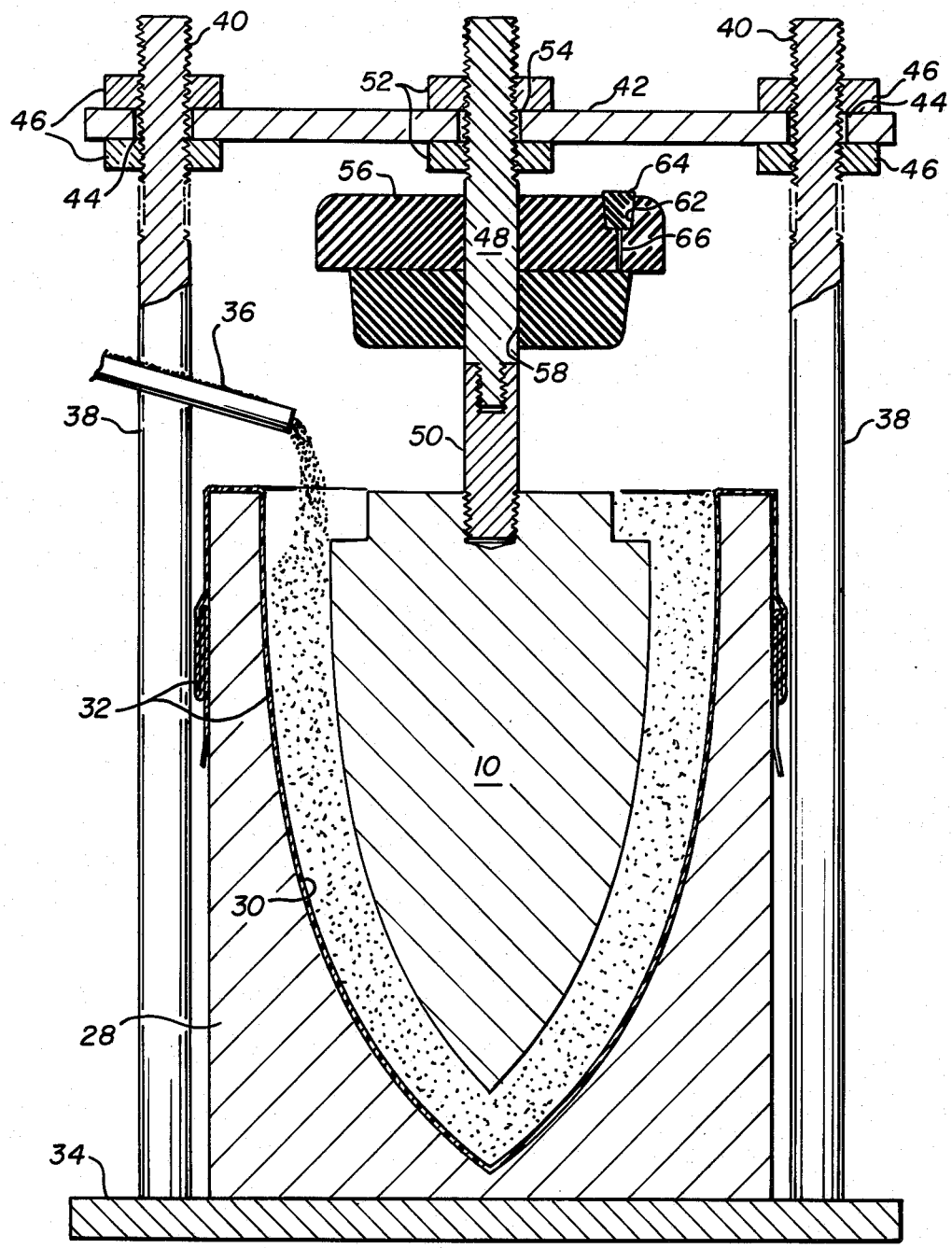
FIGS. 4A and 4B are cross-sectional views illustrating the method of packing the PTFE composite powder around a mandrel.
Figure 4B:
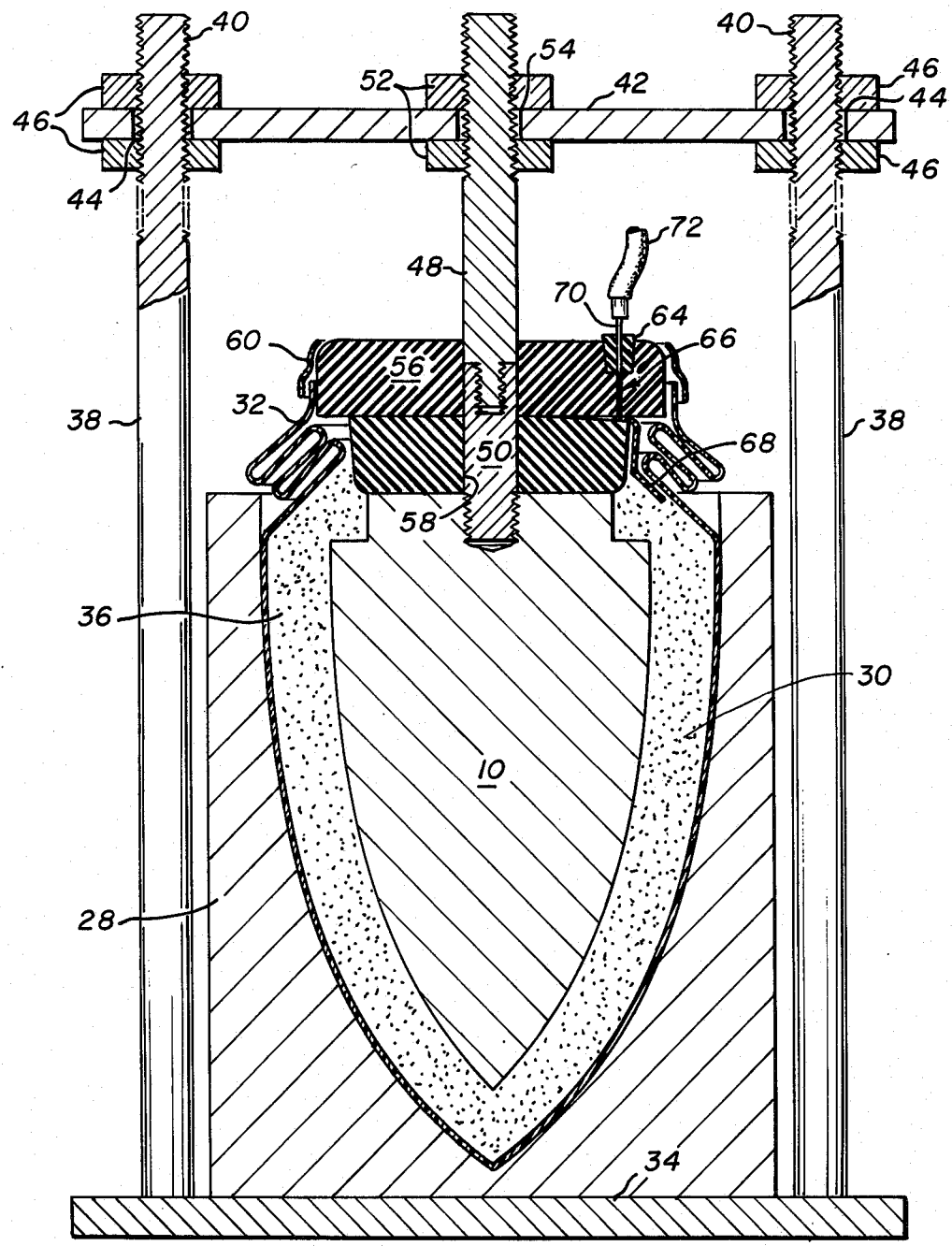

With reference to FIGS. 4A and 4B, one preferred method of packing the layer 12 about mandrel 10 is seen. A mold 28 is provided with a cavity 30 having a configuration resembling the outside shape of the radome. An elastic bag 32, approximately the shape of cavity 30, is positioned within cavity 30 and its open end stretched over the mold 28. The space between the bag 32 and the cavity 30 is evacuated by a high volume pump (not shown) which is connected to cavity 30 through passages provided in mold 28 (also not shown). This conforms bag 32 to the surface of cavity 30.

Mold 28 is positioned upon a base plate 34 which has mounted to it three frame posts 38 (only two of which are seen). Posts 38 are arranged triangularly and are provided with threaded ends 40. A Y-shaped support plate 42 is mounted to posts 38. This is accomplished by passing threaded ends 40 through apertures 44 of plate 42. Plate 42 is secured at a desired height by nuts 46; one on each side of plate 42.

Mounted to Y-shaped support plate 42 are a pair of interlocking support shafts 48 and 50. Shaft 48 is provided with two threaded ends while shaft 50 is provided with only one threaded end. The second end of shaft 50 has internal threads which engage an end of shaft 48. The other end of shaft 48 passes through an aperture 54 of plate 42 and is held to plate 42 by a pair of nuts 52.

The threaded end of shaft 50 is threaded into mandrel 10. Mandrel 10 is then lowered into cavity 30 of mold 28 until the desired distance between cavity 30 and mandrel 10 is achieved. This is accomplished by the proper positioning of nuts 46 and 52. This distance should be sufficient enough to allow the appropriate amount of PTFE composite powder 36 to be placed into bag 32. An elastomeric plug 56, preferably in two sections, is positioned around shafts 48 and 50 before mandrel 10 is threadably engaged. Plug 56 is provided with a hole 58, which while allowing passage of shafts 48 and 50, provides a tight enough fit to seal a vacuum. Plug 56 is also provided with a cavity 62 for receiving a rubber stopper 64 and is provided with an evacuation port 66 at the base of cavity 62.

Powder 36 is now seived into place by a light tamping or by vibration. Caution must be taken while seiving powder 36 to evenly distribute the powder 36 within bag 32. After bag 32 is fully filled, it is closed. This is accomplished by sliding elastomeric disc plug 56 down shafts 48 and 50 until it engages mandrel 10. The bag 32 is then taped to the plug 56, preferably by plastic pressure-sensitive tape 60. This prevents liquid intrusion into bag 32 during isostatic pressing step 20.

It has been found that by evacuating air from within the bag 32 and powder 36, fissures are prevented during the pressure release stage of isostatic pressing step 20. This is preferably accomplished by positioning a fabric strip 68 against port 66, between the two sections of plug 56, and atop PTFE powder 36 before bag 32 is sealed. A large bore hypodermic needle 70 is then pierced through stopper 64 into port 66. The air is then drawn out of bag 32 and powder 36 by attaching needle 70 to a vacuum pump (not shown) through tubing 72. The air is withdrawn by pumping down for at least one hour. After the air is withdrawn, the needle 70 is removed; stopper 64 being self-sealing. Shaft 48 threadably disengages shaft 50 and is replaced by machine screw 74 and stopper 76. This ensures proper sealing. A second elastomeric bag 78 is then placed over and taped to plug 56 by tape 80.

Figure 5:
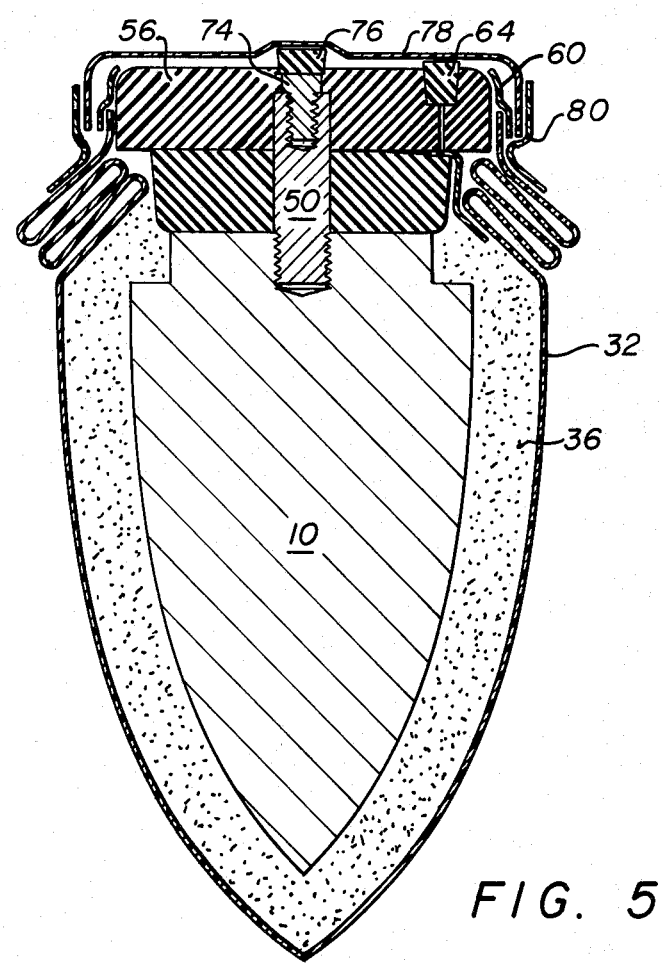
FIG. 5 is a cross-sectional view of a mandrel and PTFE composite layer in position within an elastic bag for compacting by an isostatic pressing technique.

Once the air is evacuated from bag 32 and powder 36 and the bag 78 is properly sealed, as seen in FIG. 5 isostatic pressing step 20 is commenced. This involves placing the sealed evacuated bag 32 containing mandrel 10 and powder 36 into a cold isostatic press which consists of a high pressure vessel (not shown) filled with water or other suitable liquid that will not degrade bags 32 or 78. By means of a pump the pressure of the liquid is raised slowly to the maximum desired value, preferably 30,000 psi, over a time span of about an hour. The maximum pressure is held for about 5 minutes. The pressure is then slowly reduced at a constant rate to 14.7 psi over a time span of 45 to 60 minutes. The release of pressure is typically achieved by a high pressure needle value. Caution must be taken not to release the pressure too rapidly. If the pressure is released too rapidly, the compacted powder layer 12 may fracture. While the above are the preferred pressures and times for the isostatic pressing, the maximum pressure may range from 5000 psi to 100,000 psi and be reached within 30 to 60 minutes. The maximum pressure should be held between 1 to 10 minutes. Furthermore, it is also possible to reduce the pressure from the maximum to atmospheric pressure within 5 to 60 minutes. As discussed above, mandrel 10 is provided with undercut 14. This insures that layer 12 is locked and retained upon mandrel 10 after the completion of step 20.

After completion of isostatic pressing step 20 the powder has been compacted into layer 12, which is very nearly at the ultimate desired density, having a major percentage of fibers oriented as desired. The fibers in layer 12, before the isostatic pressing step 20, are randomly oriented equally in all directions. The pressure applied during step 20 is in a direction normal to the surface of mandrel 10. This causes a large percentage of the fibers within layer 12 to be randomly oriented in a plane (not shown) parallel to the nearest surface of mandrel 10. Layer 12 is also locked to mandrel 10 at undercut 14 by the applied pressure. This may be contrasted to the technique of U.S. Pat. No. 4,364,884 wherein fiber orientation is in planes perpendicular to the radome axis.

After completing pressing step 20, the mandrel 10 and compressed layer 12 are subjected to sintering cycle step 22. This involves removing the mandrel 10 and layer 12 from the elastomeric bag 32 and subjecting layer 12 to a temperature ranging between 350° C. to 400° C., with the preferred temperature being 380° C. This heating is carried out by placing the mandrel 10 with layer 12 into a forced circulation oven which is provided with an inert atmosphere, preferably nitrogen. This sintering temperature is reached within 3 to 30 hours and held between 1 to 8 hours. The mandrel and layer 12 are then cooled to room temperature. Caution must be taken when cooling and heating the mandrel 10 and layer 12. The temperature of mandrel 10 and the surrounding atmosphere must be maintained within a narrow temperature. This is especially critical when taking the temperature up through the crystalline melting temperature of the PTFE and also when the temperature is being lowered through the recrystallization temperature of the PTFE. If the temperature differences between the mandrel 10 and the surrounding atmosphere becomes too great, the resulting radome may crack. While the above discussed sintering step 22 is the preferred method, with layer 12 still positioned upon mandrel 10, it is also possible to remove layer 12 from mandrel 10 first. This is accomplished by either machining the layer 12 off mandrel 10 or by not providing mandrel 10 with undercut 14 which allows layer 12 to be simply removed. The sintering temperature and times remain the same for both methods, except that the necessity for maintaining the temperatures of the mandrel 10 and surrounding atmosphere within a narrow range is reduced when heating layer 12 without the mandrel 10 in place.

With sintering step 22 completed, layer 12 is finished by machining it to the desired dimensions of the radome. If layer 12 remains upon mandrel 10 during sintering step 22 then the mandrel 10 may be used as a support fixture for the concentric finishing of the outside contour of layer 12. The completed radome is obtained by removing layer 12 from mandrel 10. This is accomplished by a machining operation to separate the material around undercut 14. Both the inside and outside contours of layer 12 must be machined if it has been removed from the mandrel 10 before sintering step 22.

It has also been found that by retaining layer 12 upon mandrel 10 during sintering step 22 the final percentage of fibers in the desired orientation is improved. This is a result of layer 12 being locked to undercut 14. Normally, layer 12 would creep up as it shrinks during the heating. By being locked to undercut 14, layer 12 must stretch as it shrinks in order to accommodate mandrel 10. This causes further compression of layer 12 in a direction normal to the axis of mandrel 10.

It should be apparent from the above discussion that the preferred step of retaining layer 12 upon mandrel 10 during the sintering cycle 22 reduces the necessary machining and improves the final radome product.

Figure 3:
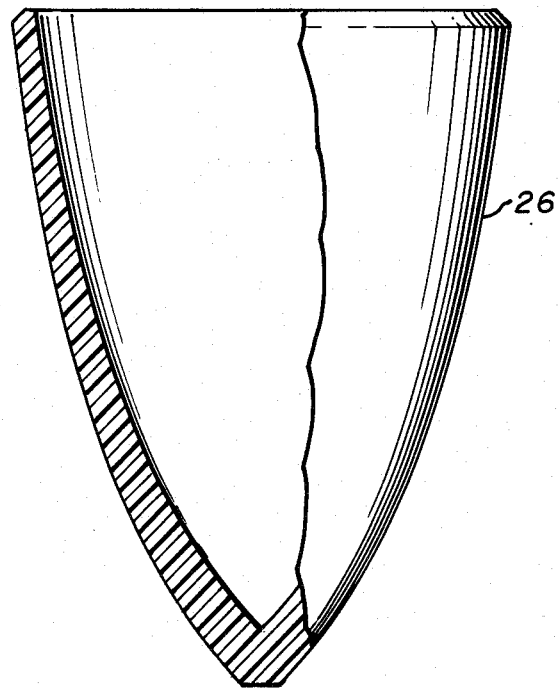
FIG. 3 shows a side-elevation view, partially in section, of a finished radome.
Figure 6:
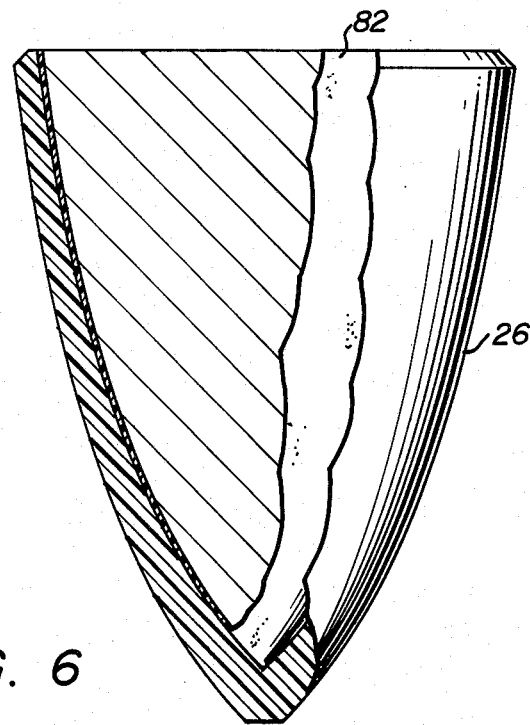
FIG. 6 is a side elevational view, partially in section, of a finished radome with a supporting liner bonded within.

With reference now to FIG. 3, a finished radome is seen generally at 26. It should be apparent that radome 26 may be produced in any desired shape by using an appropriately designed mandrel 10. For some applications it is desirable to bond a supporting liner within the finished radome 26. This is especially useful to provide additional longitudinal tensile strength to the radome. FIG. 6 shows a supporting liner 50 within radome 26. Supporting liner 82 will typically be comprised of a filament glass fiber-epoxy structure or a glass fiber-polyimide honeycomb structure. In order to perfect the bond between the radome 26 and liner 82, the inside surface of radome 26 is treated with a sodium solution, such as the Tetra-Etch product supplied by W. L. Gore, Associates. This renders the radome inner surface compatible for use with a polyimide adhesive when bonding the polyimide honeycomb structure or an epoxy adhesive when bonding the epoxy structure. The bonding of liner 82 within the radome 26 is performed by a conventional vacuum bag heating procedure. It is also possible to bond the liner 82 within the radome 26 by clamping the liner 82 against the tip of radome 26 and then wraping the outer surface of radome 26, starting with the tip, with a fabric tape. This squeezes the radome 26 against the liner 82.

While the preferred embodiment has been described and illustrated any modification or substitution may be made thereto without departing from the spirit and scope of the invention. Accordingly, the present invention has been described by way of illustration and not limitation.

What is claimed is:

1. A method for the production of a complex shape of unitary structure from fiber reinforced polymeric material comprising the steps of:

forming a mixture of powdered polymeric material and reinforcing fibers;

packing a layer of said mixture around a mandrel having a surface contour which resembles the interior surface of the complex shape;

subjecting said layer of said mixture to a sufficient pressure to compact said layer upon the mandrel to almost the ultimate desired density of said layer;

applying said pressure equally over and normal to the entire surface of the mandrel;

heating said layer to sinter said mixture;

cooling said layer; and machining said layer to the desired contour of the complex shape.

2. The method of claim 1 wherein the step of heating said layer includes:

retaining the layer upon the mandrel.

3. The method of claim 1 further comprising:

removing said layer from said mandrel prior to said heating step.

4. The method of claim 2 wherein the steps of heating and cooling include:

raising the temperature of said layer to between 350° C. and 400° C. within three to thirty hours;

holding the temperature between 350° C. and 400° C. for one to eight hours; and cooling to room temperature.

5. The method of claim 3 wherein the steps of heating and cooling include:

raising the temperature of said layer to between 350° C. and 400° C. within three to thirty hours;

holding the temperature between 350° C. and 400° C. for one to eight hours; and cooling to room temperature.

6. The method of claim 4 wherein said raised and held temperature is 380° C.

7. The method of claim 5 wherein said raised and held temperature is 380° C.

8. The method of claim 4 wherein the step of heating includes:

placing said layer in an inert atmosphere, said inert atmosphere having been heated.

9. The method of claim 5 wherein the step of heating includes:

placing said layer in an inert atmosphere, said inert atmosphere having been heated.

10. The method of claim 8 wherein the steps of heating and cooling include:

maintaining the temperatures of said inert atmosphere and said mandrel within a narrow temperature range.

11. The method of claim 1 further including the step of:

selecting a mandrel which has a surface contour resembling the interior surface of a radome.

12. The method of claim 1 wherein the step of applying pressure includes:

sealing said layer and the mandrel within a liquid tight membrane;

placing said membrane with said layer and mandrel therein in an isostatic press and raising the pressure to between 5000 psi and 100,000 psi within thirty to sixty minutes;

maintaining the raised pressure for between one and ten minutes; and reducing the pressure to atmospheric pressure within five to sixty minutes.

13. The method of claim 12 further including the step of:
   selecting an isostatic press which includes a pressure vessel filled with a suitable liquid.

14. The method of claim 12 wherein the step of sealing within a membrane comprises:
   placing the layer and mandrel in an elastomeric bag.

15. The method of claim 1 wherein the step of packing includes:
   positioning the mandrel within and spatially separated from a liquid tight membrane;
   filling the space between the membrane and the mandrel with said polymeric material fiber mixture;
   sealing said membrane from the ambient atmosphere; and
   evacuating gas which may have been present within said sealed membrane therefrom.

16. The method of claim 15 wherein the step of sealing within a membrane comprises:
   placing the layer and mandrel in an elastomeric bag.

17. The method of claim 8 further including the step of:
   selecting a mandrel which has a surface contour resembling the interior surface of a radome.

18. The method of claim 10 further including the step of:
   selecting a mandrel which has a surface contour resembling the interior surface of a radome.

19. The method of claim 12 further including the step of:
   selecting a mandrel which has a surface contour resembling the interior surface of a radome.

20. The method of claim 15 further including the step of:
   selecting a mandrel which has a surface contour resembling the interior surface of a radome.

21. The method of claim 1 including the steps of:
   orienting a majority of said fibers parallel to the interior surface of the complex shape to be produced.

22. The method of claim 8 wherein the step of heating includes:
   maintaining the temperatures of said inert atmosphere and said mandrel within a narrow temperature range when the temperature is raised through the crystalline meltting temperature of said polymeric material.

23. The method of claim 22 including:
   maintaining the temperature of said inert atmosphere and said mandrel within a narrow temperature range when the temperature is lowered through the recrystallization temperature of the polymeric material.

24. The method of claim 1 wherein said polymeric material comprises a fluoropolymeric material.

* * * * *